March 24, 1942. S. H. ENGLANDER 2,277,582
SAFETYPIN
Filed Feb. 27, 1941
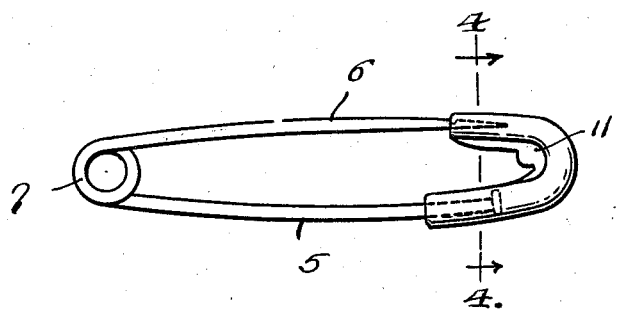
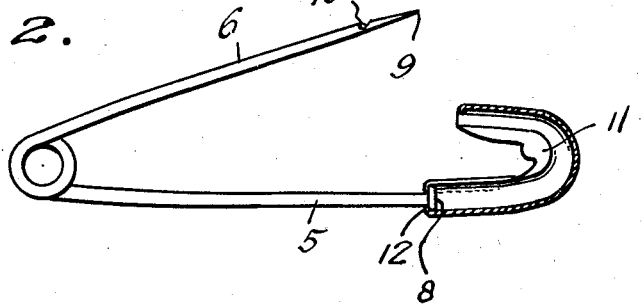
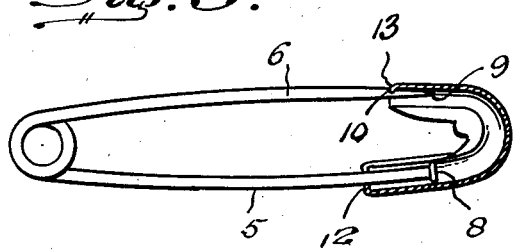
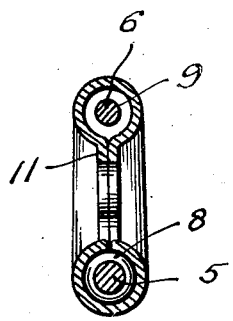
Inventor
Sidney H. Englander,
By J. Stanley Burch
Attorney Patented Mar. 24, 1942

2,277,582

UNITED STATES PATENT OFFICE 2,277,582

SAFETYPIN

Sidney H. Englander, University Heights, Ohio

Application February 27, 1941, Serial No. 380,941

2 Claims. (Cl. 24—158)

This invention relates to new and useful improvements in safety pins, and the primary object of the invention is to provide a safety pin which is simple and durable in construction, efficient in use, and adapted to be manufactured at a comparatively low cost.

More particularly, the present invention relates to a safety pin comprising a member formed of a length of spring wire and bent upon itself to form pin and back legs connected by a coil, and a guard slidably, or rotatably and slidably, connected to the back leg and adapted to receive and engage the pin leg for effectively retaining goods or fabric on said pin leg. The guard can be readily slid outwardly and disconnected from the pin leg and if rotatable, the guard can be swung laterally of the pin leg, whereby said pin leg may be more conveniently removed and replaced in the goods or fabric.

The present invention consists in the novel features of construction, combination and arrangement of parts hereinafter more fully described, shown in the accompanying drawing and claimed.

In the drawing:

Figure 1 is an elevational view of a safety pin constructed in accordance with the present invention, the pin being in closed condition.

Figure 2 is a view similar to Figure 1 with the guard in longitudinal section and with the pin in open condition.

Figure 3 is a view similar to Figure 2 with the pin in closed condition; and

Figure 4 is an enlarged transverse section taken on line 4—4 of Figure 1.

Referring in detail to the drawing, the present safety pin includes a member formed of a length of spring wire bent upon itself to provide back and pin legs 5 and 6 connected by a coil 7. The free end of back leg 5 is provided with an enlarged circular head 8, while the free end of leg 6 is pointed as at 9 and is provided near its pointed end with a transverse groove or notch 10.

The safety pin also includes a guard consisting of a strip of metal folded longitudinally to provide a tube whose edges are flanged and secured together as at 11. This tube is bent into substantially U-shape with one leg thereof longer than the other and inwardly flanged at its free end as at 12. The back leg is slidably engaged in the longer leg of the guard, as well as swiveled therein, the head 8 of the back leg 5 cooperating with the flanged end 12 of the guard to limit the sliding movement of the guard relative to the back leg 5. The free end of the shorter leg of the guard is provided at its outer side with an inturned lug 13 adapted to engage in the notch or groove 10 and thereby retain the pointed end of the pin leg 6 within the shorter leg of the guard as shown in Figures 1 and 3, under ordinary conditions, the tension of the legs 5 and 6 away from each other maintaining this engagement of the lug 13 in notch 10. Thus, accidental disengagement of the pin leg 6 from the guard and effective maintenance of the goods on the pin leg 6 is provided for. Upon squeezing the legs 5 and 6 together, the guard 8 may be slid outwardly relative to the wire member until the pin leg is disengaged from the guard, whereupon said guard may be rotated or swung laterally away from the pin leg so that the goods may be conveniently engaged with or disengaged from said pin leg 6. The inward pressure of leg 6 toward leg 5, of course, results in disengagement of the notched end of pin leg 6 from the lug 13 of the guard.

From the foregoing description, it is believed that the construction and manner of use, as well as the advantages of the present invention, will be readily understood and appreciated by those skilled in the art.

What I claim as new is:

1. A safety pin comprising a member in the form of a length of spring wire bent upon itself to provide back and pin legs connected by a coil, the free end of the back leg having an enlarged circular head formed thereon, the free end portion of the pin leg being pointed and being provided near said pointed end with a transverse notch in the outer side thereof, and a guard member in the form of a strip of metal folded upon itself longitudinally to provide a tube of U-shape having relatively long and shorter legs, the free end of the relatively long leg of the guard being flanged inwardly and slidably receiving the back leg as well as cooperating with the head of the back leg to limit sliding movement of the guard relative to said wire member, the relatively long leg of the guard being of round cross section to permit swinging of the guard about the back leg laterally of said pin leg, and the shorter leg of the guard having an inwardly directed lug at the outer side thereof adapted to engage in the notch of the pin leg to retain the latter in engagement with said guard.

2. A safety pin comprising a member in the form of a length of spring wire bent upon itself to provide back and pin legs connected by a coil, the free end of the back leg having an enlarged circular head formed thereon, the free end portion of the pin leg being pointed and being provided near said pointed end with a transverse notch in the outer side thereof, a guard member in the form of a strip of metal folded upon itself longitudinally to provide a tube of U-shape having relatively long and shorter legs, the free end of the relatively long leg of the guard being flanged inwardly and slidably receiving the back leg as well as cooperating with the head of the back leg to limit sliding movement of the guard relative to said wire member, the relatively long leg of the guard being of round cross section to permit swinging of the guard about the back leg laterally of said pin leg, the shorter leg of the guard having an inwardly directed lug at the outer side thereof adapted to engage in the notch of the pin leg to retain the latter in engagement with said guard, said guard being slidable outwardly relative to the wire member and swingable laterally relative to the pin leg upon forcing the legs of the wire member together sufficiently to cause disengagement of the lug of said guard from the notch of the pin leg.

SIDNEY H. ENGLANDER.